July 4, 1933.  E. H. LEWIS  1,916,765

POSITION AND ALTITUDE FINDER

Filed March 21, 1931  2 Sheets-Sheet 1

INVENTOR
E. H. Lewis
By E. J. Featherstonhaugh
ATTORNEY

July 4, 1933.   E. H. LEWIS   1,916,765

POSITION AND ALTITUDE FINDER

Filed March 21, 1931   2 Sheets-Sheet 2

INVENTOR.
E. H. Lewis.
By E. J. Fetherstonhaugh
ATTORNEY.

Patented July 4, 1933                                                        1,916,765

UNITED STATES PATENT OFFICE

ERNEST HENRY LEWIS, OF VERDUN, QUEBEC, CANADA

POSITION AND ALTITUDE FINDER

Application filed March 21, 1931. Serial No. 524,310.

The invention relates to a position and altitude finder, as described in the present specification and illustrated in the accompanying drawings that form part of the same.

The invention consists essentially in the means employed for calculating longitudinal, vertical, transverse and angular distances from a given point on a moving or movable calculator, as pointed out in the claims for novelty following a description in detail of the parts and their relationships required to carry out the objects of this invention.

The objects of the invention are to facilitate the finding of a position of a ship at sea in relation to any fixed object, such as a lighthouse, rocks, shoals, islands, points and peninsulas or other marks that may prove dangerous or that may enable the master of the ship to guide his vessel to a predetermined destination and further to calculate distances of points out of the course of the ship and in the course of the ship for many purposes incidental to the use on the sea; to simplify the computation of distances on land, either on the level or at an altitude or both and thereby enable location and other engineers to survey the country about prior to the use of the more complicated instruments, well known in the profession of civil engineering; thereby making estimates possible for different routes at a comparatively moderate expenditure, as well as materially reducing the quantity of equipment customarily found necessary to be transported with surveying parties; to insure a reasonable accuracy in the calculations both on land and at sea without the requirement of a deep knowledge of mathematics by the operating person, and in this connection to furnish to the public a calculating device that will be of immense service to such organizations as boy scouts and girl guides and also to students at schools and universities with whom an elementary knowledge will be quite sufficient to operate the position finder; and generally to provide a simple and efficient instrument which will prove economical in so far as production and repair are concerned and yet be of durable and stable construction.

In the drawings, Figure 1 is a perspective view of the position finder showing the longitudinal and transverse scales.

Like numerals of reference indicate corresponding parts in the various figures.

Figure 2:
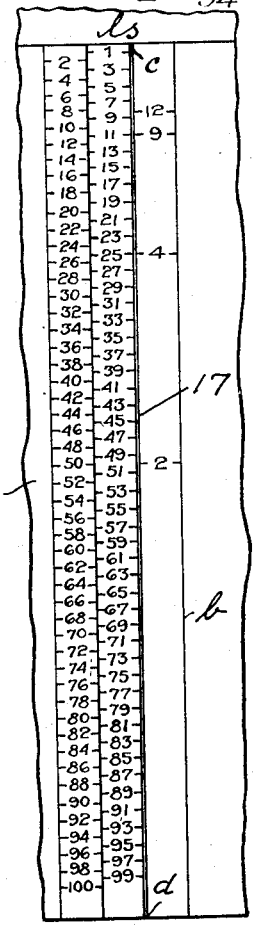
Figure 2 is an enlarged fragmentary view showing the longitudinal scale.
Figure 10:
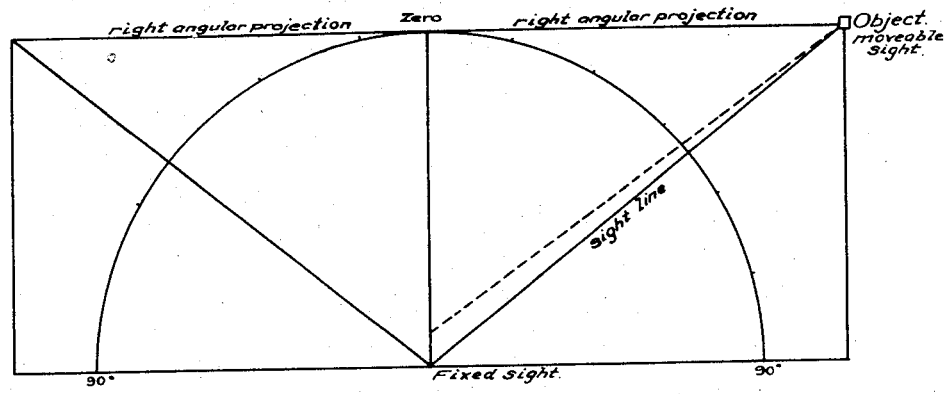
Figure 10 is a diagrammatic view showing a triangle on which the calculations are based, for range course or altitude findings.
Figures 11, 12:
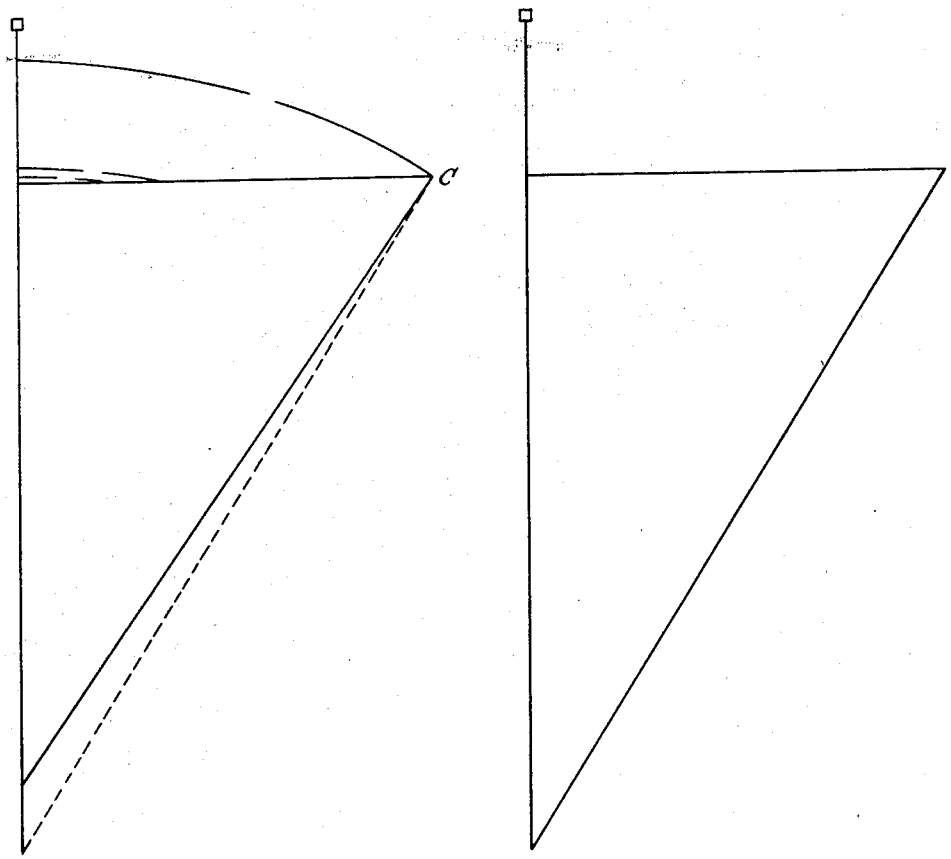
Figure 11 is a diagrammatic view showing a triangle on which the calculations are based, particularly for offside, range or course findings.
Figure 12 is a diagrammatic view for the offside object measurements showing the second sight line and the original sight line dotted.

Referring to the drawings, the board of the instrument is indicated by the numeral 15, though it must be understood that this is not necessarily a board as it may be a block or a strip or it may take any form which will lend itself to establishing thereon a longitudinal scale, indicated by the letters *ls*. (Fig. 2).

The longitudinal scale is so named for the reason that this scale is always along the line of direction, which may otherwise be termed the "course" in sea work and the "range" in land work, but these terms may be applied either way,—still in order to avoid any confusion in the understanding of this invention the two words will be used for what is otherwise the line of direction.

This board is shown with three slideways 17, 18 and 19 parallel to one another, the slide 17 being in the center, the slide 18 between the center and the side edge of the board and the slide 19 being between the center and the other side edge of the board.

This board at what may be called the outer end has a bead 20 forming a stop and the board itself may be mounted on the tripod 21 or on any suitable support, though a tripod is quite convenient, especially for field work, and it is usual to mount a board of the kind so that it may be turned and held by set screw to a temporary fixed position.

The scale $ls$ is made on one side of the slideway 17 and the graduations are numbered from one to one hundred and it is preferable to establish a definite length for the scale which in practice has been made twelve and one half inches and it is on this longitudinal scale that the simple calculations are made by a percentage method.

This length of twelve and one half inches has been mentioned for convenience in explanation, as the longitudinal scale may be any length desired.

On either side of the slideway 17 the scale is shown in fractions of the twelve and one half in the length, as for instance, one-eleventh, one-twelfth, one-sixth, one-fifth, one-third, one-half.

The percentage side of the scale is indicated by the letter $a$ and the fraction side of the scale is indicated by the letter $b$, while zero is indicated by the letter $c$ and the other end of the scale, that is to say, the inner end, by the letter $d$.

The transverse bar 22 is formed with the slideway 23 extending throughout its whole length and carries the runners 24 sliding in the slideways 17, 18 and 19, the bead 20 forming a stop for this transverse bar at the outer end of the board, while the bar itself slides inwardly towards the person using the instrument, being moved preferably by hand.

The transverse front scales are indicated by the letters $e$ and $f$ and the transverse top scales are indicated by the letters $g$ and $h$.

The transverse front scales $e$ and $f$ run in consecutive numbers to the extreme ends of the transverse bar and are marked by graduations evenly spaced, each scale starting at zero indicated by the letter $i$ on the transverse bar.

Figure 1:
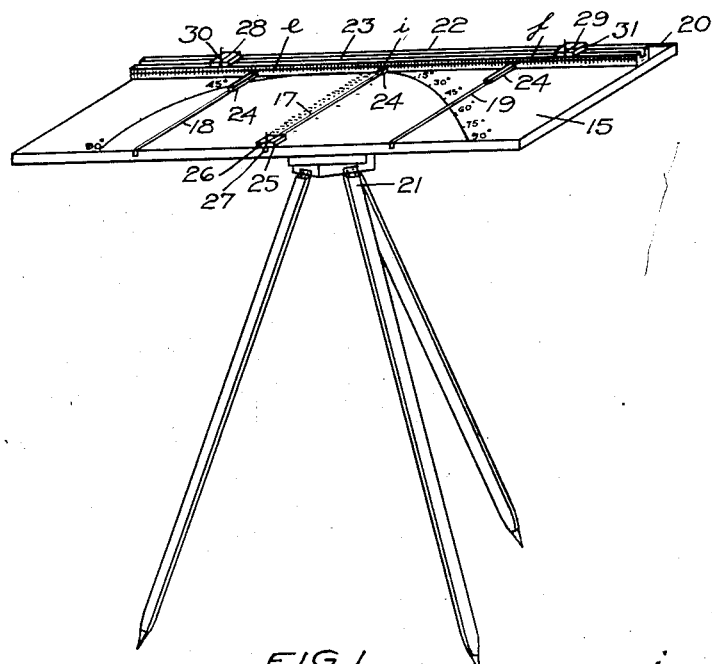
Figure 3:
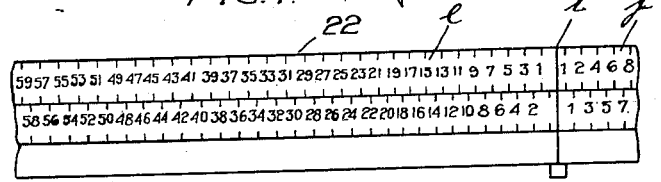
Figure 3 is a fragmentary view showing a transverse scale.
Figure 4:
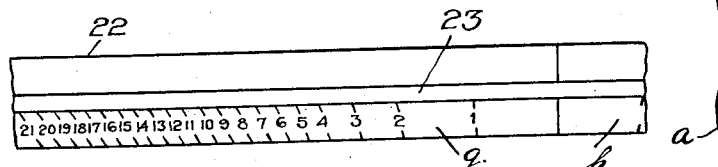
Figure 4 is a fragmentary view showing a transverse scale for offside finding.
Figure 8:
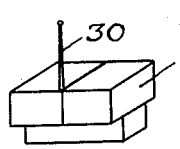
Figure 8 is a perspective view of the transverse movable sight.
Figures 6, 9:
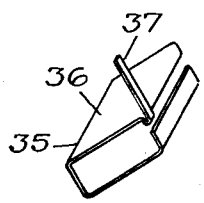
Figure 6 is a perspective detail of a fixed sight.
Figure 9 is a perspective detail of the movable sight for altitude finding.
Figure 7:
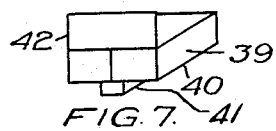
Figure 7 is a perspective detail of the fixed sight for altitude finding.
Figure 5:
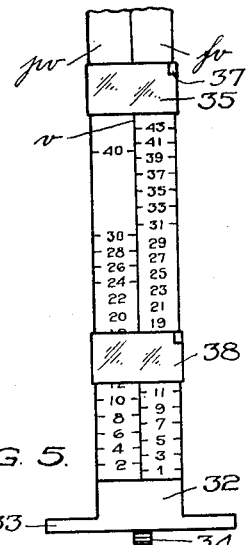
Figure 5 is an elevational view of the vertical scale.

The top scales $g$ and $h$ (Fig. 4) are somewhat different, as they are used in conjunction with the changing position of a sight line representing the hypothenuse of a triangle, in which the longitudinal scale $ls$ and front scale $e$ or $f$ form the sides of a right angle triangle, so the graduations of the scales $e$ and $f$ correspond to the graduations of the scale $ls$, though graduations of the front scales may extend to a greater extent than the graduations of the longitudinal scale, and naturally they enable the calculator to compute the transverse distance.

To compute the distance represented by the hypothenuse of the triangle, the percentage method is used and in this the graduations in the scales $g$ and $h$ widen out in relation to one another, as they approach zero from either end of the transverse bar and the percentage pointed out by this line on a scale $g$ or $h$ is computed on the course line total distance and added thereto.

The fixed sight 25 is a block or shape from which the needle 26 projects upwardly and under which the strip 27 is attached, this strip being inserted in the slideway 17 at the end of the scale $ls$.

The movable sights 28 and 29 of any suitable shape are also made with a needle and runner, sliding in the slideway 23 of the transverse bar, the sight 28 having the needle 30 projecting upwardly therefrom forming the sight and the sight 29 having the needle 31 projecting upwardly therefrom.

The vertical scale is indicated by the letter $v$, the percentage side being indicated by the letters $pv$ and the fraction side by the letters $fv$.

This vertical scale is made of a post 32 standing on a base 33 or otherwise mounted and under which the runner 34 is secured and sliding in the slideway 17 in place of the transverse bar 22 or therewith as it may be carried thereby.

The sight 35 is formed of a clamping sleeve 36 engaging the post, and arm 37 extending outwardly therefrom and forming the actual sight.

A similar sight 38 is mounted on the post 32 for determining the horizontal, while the sight 35 is moved upwardly or downwardly and aligns the fixed object beyond.

The fixed sight 39 is formed of the block 40 or other shape having the strip 41 thereunder for insertion in the slideway 17 at the end of the longitudinal scale $ls$ and a straight edge 42 projecting upwardly for aligning with the sight 38 and also with the sight 35.

The operation of the instrument is best illustrated by the assumption of an example. If it be assumed that the vessel is proceeding at ten knots and that a lighthouse is observed at about three points to starboard and it is required to take observations on this lighthouse, the procedure would be as follows:

(1) Set all the sights at zero and the horizontal sliding bar forward at its zero position.

(2) Notify the helmsman to steer a straight course.

(3) Noting the time on reference watch, sight through the back sight and the starboard sliding sight, moving the latter along the horizontal bar, but not moving the horizontal bar itself, until the lighthouse is in line with the two sights.

(4) After six minutes of the ship's run take a second bearing on the same lighthouse by moving the horizontal sliding bar aft until the sliding sight is again in line with the back sight and the lighthouse. Care must be taken not to move the sliding sight on the horizontal bar during this observation. Note is now taken of the indication given by the graduated scale along the centre line of the base plate where the after face of the horizontal sliding bar is now standing. This percentage is the percentage which the distance of travel of the ship between the two observations bears to the distance between the position of the ship when the first observation was taken and the position of the ship when the lighthouse will be directly abeam.

In the example, with a speed of ten knots and a time interval of six minutes, the distance travelled is one knot. If the graduation indicated by the pointer on the face of the horizontal sliding bar after the second observation has been taken is nine percent (9%) then the one knot is nine percent (9%) of the distance from the ship's first position to the abeam position, or in other words, the ship must travel slightly over eleven (11) knots from the position of the first observation in order to have the lighthouse directly abeam on the starboard side.

Note is also taken of the graduation indicated on the scale graduated on the aft face of the horizontal sliding bar by the pointer attached to the sliding sight. This figure indicates the ratio between the normal distance from the lighthouse to the straight line course of the vessel and the distance to be travelled by the vessel from the point of the first observation to the abeam point. In other words, if the pointer indicates 40%, the lighthouse is 40% of eleven knots, that is to say about four and a half (4½) knots, to starboard of the straight course of the ship.

Thirdly, if it be desired to find the distance from the ship's position at the first observation directly to the lighthouse, the graduated scale on the top face of the horizontal sliding bar may be used. The figure on the scale indicated by the pointer on the sliding sight shows the percentage by which this direct distance exceeds the distance which the ship must travel from its first observation position to its abeam position. For instance in the example taken, the indication will be about ten percent (10%) meaning that the direct distance from the vessel to the lighthouse was almost 12¼ (twelve and one quarter) knots.

In land use, the operation is just the same, the only difference being that in place of the moving ship, the instrument itself is advanced a length of ground previously chained, or measured out. What this length may be is entirely at the operator's discretion but the distance to the zero mark or to the right angle is determined in exactly the same way, for the distance that the instrument is moved forwardly is taken as a basis for the percentage and from that percentage is calculated the distance of the actual range line and also the distance of the right angular projection line to the object. All this may be done from either side as can readily be seen,—the object of course is fixed.

The diagrammatic views help to explain the finding of the distance of an offside object or in other words, the length of the hypothenuse of the triangle.

To do this the range or course line is made a sight line and an object quite beyond the sight object is taken as direction, and so sighted, then the offside object is sighted along the hypothenuse of a right angle triangle and a reading is taken on a top scale, say on the scale $g$ or the scale $h$ and this percentage is added to the length of the course or range line, the range of which has already been determined on the same methods as have been carefully explained herein, that is to say, if it is at sea the speed of the ship is used, and if it is on land the instrument is moved and the length of the line to zero calculated.

It will thus be seen that distances can be found with great ease and by very simple methods, such as can be understood by the lay mind, therefore, students and others may readily practice in fields and on the water. Also in more serious pursuits the instrument can be used with great advantage by the masters of ships and by location engineers.

In determining distances in so far as altitude is concerned the same principle is used throughout. The right angle triangle is found by using the straight edge sight and the lower sight on the altitude post, the upper sight being brought into alignment with the top of the elevation and the calculation made in precisely the same way as has been fully described herein.

It is of course obvious from the aforesaid description of the operation of the instrument that sights may be taken and distances measured above and below the level of the instrument itself, that is to say, if the instrument is supported on a level which is intermediate in so far as altitude is concerned of the levels of the objects, then there will be two right angled triangles, thus the horizontal line will intersect a common base forming thereby a downwardly inclined hypothenuse and an upwardly inclined hypothenuse, the common base having graduations on either side of zero which is situated at the intersection of the horizontal sight line with said common base.

This is merely doubling up the operation of calculation as clearly explained hereinbefore and shown in the diametrical figures.

What I claim is:—

1. In an altitude finder, a base having a longitudinal scale and a scale at right angles thereto movable along said longitudinal scale on said base, a pair of sights adjustable on and along said right angular scale and a fixed sight at the inner end of said longitudinal scale for determining sight lines in conjunction with said movable sights.

2. A position finder comprising a board having a longitudinal scale in respect to course or range and a slideway parallel with said scale, a transverse bar operating in said slideway and travelling from zero to the end of the scale and return and having scales extending in opposite directions from a zero mark coincident with said longitudinal scale, a fixed sight at the end of the longitudinal scale, a pair of movable sights respectively on said scales of said transverse bar and means for supporting said board.

3. A position finder comprising a board having a longitudinal scale in respect to course or range and a slideway parallel with said scale, a post extending upwardly from a base having a runner sliding in said way and carrying a vertical scale in consecutively numbered graduations from zero upwardly, a fixed sight having a straight edge and inserted in said slideway at the end of said longitudinal scale, a pair of movable sights formed of sleeves and arms and adapted with said straight edge to determine a horizontal sight line and the hypothenuse of a calculating triangle and means for supporting said board.

Signed at Montreal, Canada, this 21st day of February 1931.

ERNEST HENRY LEWIS.